(12) United States Patent
Sharma et al.

(10) Patent No.: US 6,857,051 B2
(45) Date of Patent: *Feb. 15, 2005

(54) METHOD AND APPARATUS FOR MAINTAINING CACHE COHERENCE IN A COMPUTER SYSTEM

(75) Inventors: Vinod Sharma, San Jose, CA (US); Edward T. Grochowski, San Jose, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 09/221,270

(22) Filed: Dec. 23, 1998

(65) Prior Publication Data

US 2003/0009638 A1 Jan. 9, 2003

(51) Int. Cl.$^7$ ............................................... G06F 12/00
(52) U.S. Cl. ...................................... 711/145; 711/144
(58) Field of Search ................................. 711/145, 144, 711/141, 156, 143

(56) References Cited

U.S. PATENT DOCUMENTS

| | | | | | |
|---|---|---|---|---|---|
| 5,130,922 A | * | 7/1992 | Liu | ............................. | 711/144 |
| 5,297,269 A | * | 3/1994 | Donaldson et al. | ......... | 711/145 |
| 5,317,716 A | * | 5/1994 | Liu | ............................. | 711/120 |
| 5,706,463 A | * | 1/1998 | Ebrahim et al. | ............ | 711/120 |
| 5,752,264 A | * | 5/1998 | Blake et al. | ................. | 711/122 |
| 6,049,851 A | * | 4/2000 | Bryg et al. | .................. | 711/141 |
| 6,052,760 A | * | 4/2000 | Bauman et al. | ............. | 711/119 |
| 6,088,758 A | * | 7/2000 | Kaufman et al. | ........... | 709/213 |
| 6,438,659 B1 | * | 8/2002 | Bauman et al. | ............. | 711/141 |

* cited by examiner

*Primary Examiner*—Matthew D. Anderson
(74) *Attorney, Agent, or Firm*—Blakely, Sokoloff, Taylor & Zafman LLP

(57) ABSTRACT

The computer system includes a processor having an associated cache to store a data segment in a Read Only state. For one embodiment, a Read Only state may indicate that no other processor of the system has a clean, valid copy of the segment. Before the processor may write to the segment in a Read Only state, however, the processor may first request ownership of the segment. As an alternative to storing the segment in a Read Only state, the segment may be stored in a Modified, Exclusive, Shared, Invalid or any other state.

20 Claims, 4 Drawing Sheets

METHOD AND APPARATUS FOR MAINTAINING CACHE COHERENCE IN A COMPUTER SYSTEM

The present invention relates to computer systems and more particularly to cache coherence protocols in multiprocessor computer systems.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions. Increasing the speed at which instructions are executed by the processor tends to increase the computational power of the computer. Processor designers employ many different techniques to increase processor speed to create more powerful computers for consumers. One such technique is the use of cache memory.

Cache memory is a type of buffer memory that resides between the main memory and each processor of a computer system. Cache memory has a much smaller capacity than main memory and resides closer to the processor. Because of this, the processor can more quickly read data from the cache than from main memory. To exploit this characteristic of cache memory, complex schemes are implemented to predict what data a processor will need to read in the near future, and to transfer that data from main memory to the cache before the processor reads it. In this manner, data access speed and, consequently, processor speed, is increased. Typically, each processor in a multiprocessor computer system has its own, associated cache.

One problem with implementing caches in a computer system resides in the fact that a processor not only reads data from its cache but also writes data to its cache. Suppose, for example, that the same data is transferred into a first cache of a first processor and a second cache of a second processor. Initially, both processors read the data from their respective cache. Suppose, further, that the data in the first cache is eventually overwritten with newer, updated data while the original data in the second cache remains unchanged. If the second processor continues to read the original, unmodified, data from its cache, a cache coherence problem exists. That is, the unmodified data (also called stale or old data) in the second processor's cache becomes erroneous as soon at the first processor modifies the data in its own cache.

Somehow, all the processors in a multiprocessor system must be able to read only the "freshest" data from their respective caches to keep the overall system coherent. The mechanism by which the system is kept coherent is called the cache coherence protocol.

One type of protocol is known as the MESI cache coherence protocol. The MESI protocol defines four states in which a cache line may be stored. They are Modified, Exclusive, Shared, and Invalid. Unfortunately, the MESI protocol may lead to inefficient inter-device communications in some applications. These inefficiencies become more taxing on system performance as the bus bandwidth becomes more constrained.

SUMMARY OF THE INVENTION

In accordance with one embodiment of the present invention, a computer system includes a processor having an associated cache to store a data segment in a Read Only state. Alternatively, the segment may be stored in a Modified, Exclusive, Shared, Invalid, or any other state.

Other features and advantages of the present invention will be apparent from the accompanying figures and the detailed description that follows.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, cache coherence is maintained in a computer system using a Modified (M), Exclusive (E), Read Only (R), Shared (S), and Invalid (I) protocol called MERSI. The R state is similar to an E state in that a processor having a cache that stores a cache line in an R state is constrained to be the only cache that has a clean, valid, copy of that data in the computer system. Therefore, the R state may be thought of as an "exclusive read only" state. Unlike the E state, however, the processor must first request ownership of the cache line in the R state before the processor writes to the line (and transitions to the M state). In contrast, a transition from the E to M state is silent.

One advantage to providing notification of the R to M state transition is that the system is able to better track cache line states. Better tracking of cache line states may not only reduce bus traffic but also increase system response time. A more detailed description of embodiments of the present invention, including various configurations and implementations, is provided below.

Although many cache coherence protocols are implemented on a cache line-by-line basis (i.e., each cache line is associated with a single state), this invention is not to be so limited. The MERSI cache coherence protocol described herein may be implemented on data portions of any length, or combination of lengths, including, for example, bit, byte, word, line, block, page, or any other size of data. For this reason, the more generic term "data segment" or "segment" is used to describe the basic data portion of any size associated with a single state. The term "cache", as used herein, includes all caches and cache levels associated with a particular processor, including, for example, L0-data, L0-instruction (if not unified), L1, L2, L3, etc, caches. For one embodiment of the present invention, the highest level cache associated with a particular processor (i.e. the cache level closest to the main memory of the computer system) includes all the data segments stored in lower cache levels of the processor. The term "ownership", with respect to a data segment, means write privileges to the segment (which may imply that other copies of the data segment in other caches are invalidated).

Also, note that the terms "cache" and "processor" may occasionally be interchanged for convenience and simplicity. For example, the phrase "the cache requests ownership of the segment" is understood to mean, more precisely, "the processor to which the cache is associated requests ownership of the segment." Similarly, the phrase "another processor has the segment" is understood to mean, more precisely, "the cache of another processor is storing the segment."

Figure 1:
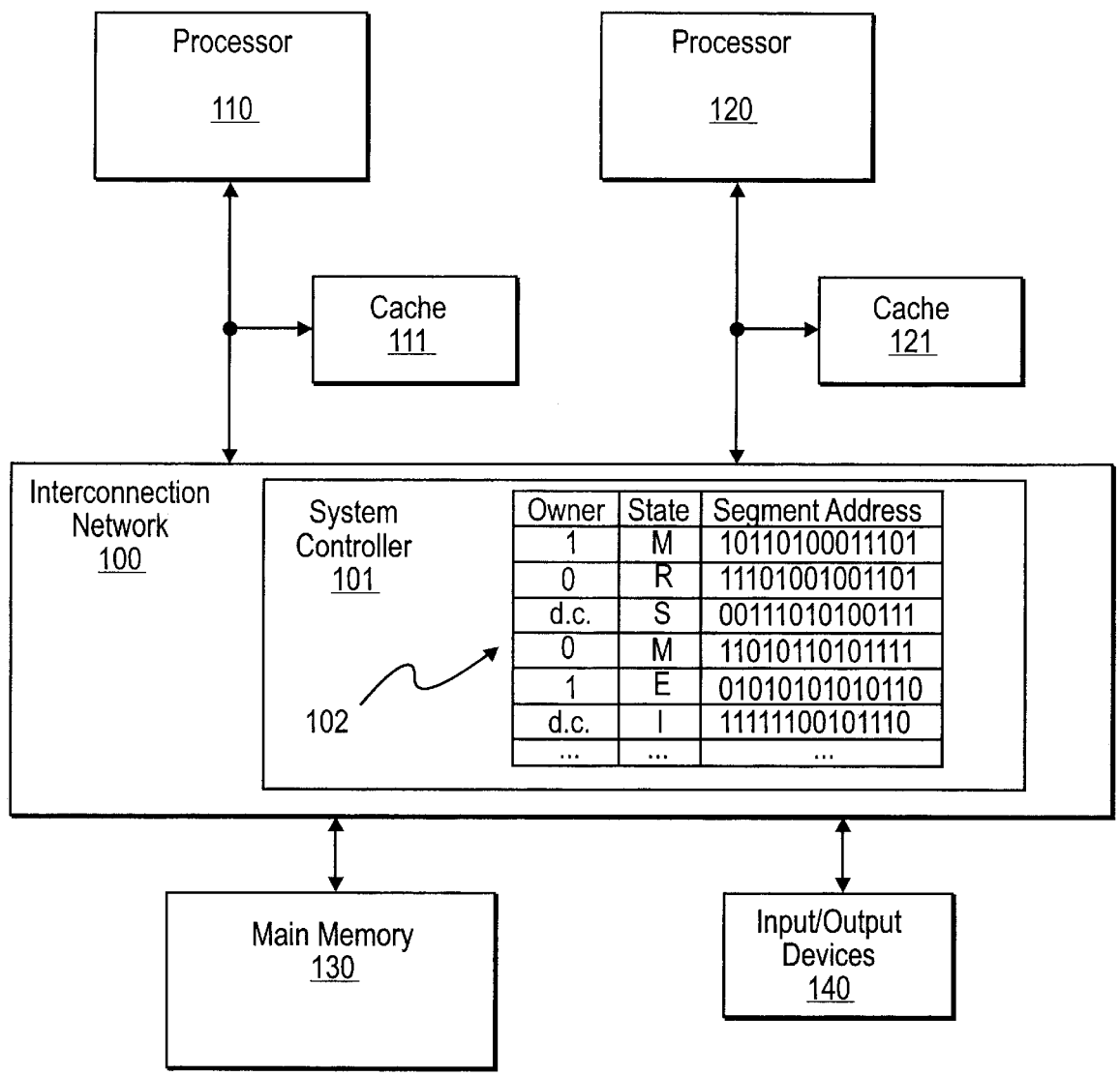
FIG. 1 is a computer system formed in accordance with an embodiment of the present invention.

FIG. 1 is a computer system formed in accordance with an embodiment of the present invention in which cache 111 of processor 110 and cache 121 of processor 120 are coupled to interconnection network 100. Interconnection network 100 includes system controller 101 which maintains centralized cache coherence directory 102. Also coupled to network 100 is main memory 130 and input/output devices 140.

Cache 111 of processor 110 may be disposed on the same integrated circuit as processor 110, external to processor 110, or some combination thereof. Similarly, Cache 121 of processor 120 may be disposed on the same integrated circuit as processor 120, external to processor 120, or some combination thereof. The multiprocessor computer system of FIG. 1 may include additional processor/cache nodes.

The computer system of FIG. 1 illustrates a directory-based embodiment of the present invention implemented on a distributed shared memory architecture. Although the embodiment of the MERSI cache coherence protocol described below is primarily directed to the directory-based system of FIG. 1, the present invention is not so limited. For an alternate embodiment of the present invention, the MERSI cache coherence protocol described herein may be implemented in a centralized shared memory architecture that uses snooping techniques to track the MERSI states in each cache of the system. Also, note that although the directory-based embodiment of FIG. 1 shows only a single directory 102 to store and maintain the states of the data segments, an alternate embodiment may be implemented in which the processors or caches also store the state information. This embodiment may be found useful to increase efficiency.

Although the embodiment of the present invention described below primarily focuses on cache coherence, it is to be appreciated that system controller 101 of FIG. 1 may also support the coherence of read and write accesses to main memory by input/output devices 140. In addition, although the embodiment described herein primarily focuses on the MERSI cache coherence protocol, it is to be appreciated that the novel R state described herein may be implemented in conjunction with other cache coherence protocols. For example, for one embodiment of the present invention, a MOESI protocol is modified to include the R state.

Directory 102 of FIG. 1 includes three columns. The first column, Owner, identifies the owner, if any, of the segment. The second column, State, identifies the state of the segment. The last column, Segment Address, identifies the memory address of the data segment stored in one or more of the caches. For one embodiment of the present invention, directory 102 includes an entry for each data segment that is stored in one or more of the caches of the computer system. Note that the values entered in directory 102 are for demonstration purposes only. For an alternate embodiment, there are more bits in the Owner and Segment Address columns, and the states in the State column are similarly represented by binary digits.

For one embodiment of the present invention, the value in the Owner column of Directory 102 of FIG. 1 indicates which of the processors coupled to interconnection network 100 has ownership of the associated data segment when the segment is in a M, E, or R state. For example, the first row indicates that the processor designated as "1" owns the data segment of the associated address in the M state. The second row indicates that the processor designated as "0" owns the data segment of the associated address in the R state. For a data segment in the S or I state, the value in the Owner column is a "don't care" (d.c.). When a data segment is in the S state, and a processor requests ownership of the data, the system controller sends a global invalidation request to all other processors in the system.

Note that the values in the Owner column of directory 102 of FIG. 1 are binary encoded to designate ownership of the associated data segment. This has space saving advantages over using a "one hot" encoding scheme in which each processor of the system has an associated bit that designates whether or not the processor has the data segment stored in its respective cache. For example, as shown in FIG. 1, a single bit in the Owner column accommodates a dual processor system, whereas a "one hot" encoding scheme would require two bits. For a larger system including, for example, 64 processors, the binary encoding scheme of FIG. 1 would require six bits per data segment in the Owner column whereas a "one hot" encoding scheme would require 64 bits.

Figure 2:
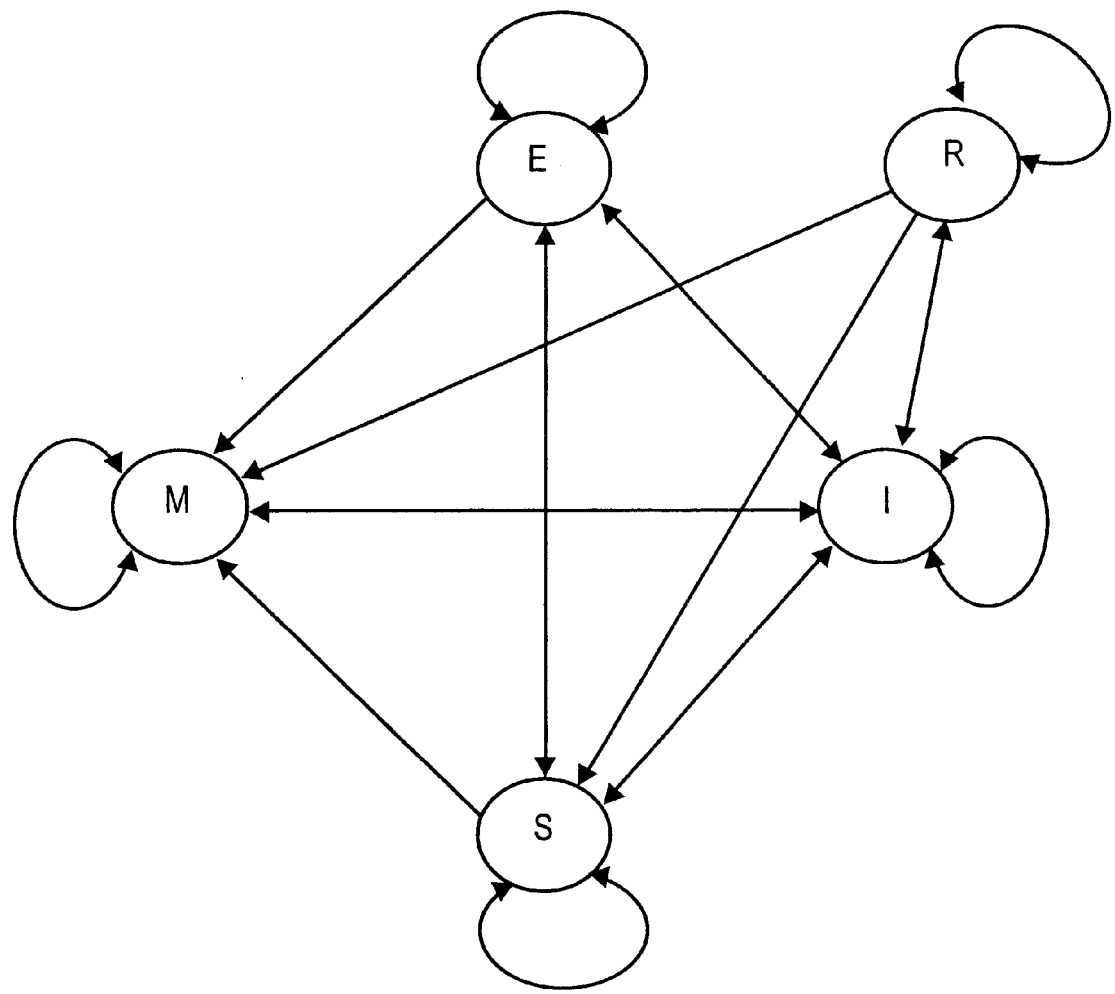
FIG. 2 is a state diagram implemented in accordance with an embodiment of the present invention.

When a read from or write to main memory request is intercepted by system controller 101 of FIG. 1, the system controller compares the segment address of the read/write request to the segment addresses in directory 102. Depending on the state of the segment indicated in the directory, system controller 101 takes whatever action is necessary to maintain cache coherence. In addition, system controller 101 responds to special cache coherency requests from processors 110 and 120 such as requests for ownership of a particular data segment. System controller 101 maintains cache coherency in this manner according to the state diagram of FIG. 2, the state transitions of which are described in Table 1.

TABLE 1

| Current State | Event | Next State |
|---|---|---|
| Invalid (I) | No Request | I |
| | (Exclusive) Read, no other processor has the segment | E |
| | (Read Only) Read, no other processor has the segment | R |
| | (Exclusive) Read, another processor has the segment in M state | E |
| | (Read Only) Read, another processor has the segment in M state | R |
| | (Exclusive) Read, another processor has the segment in E state | S |
| | (Read Only) Read, another processor has the segment in E state | S |
| | (Exclusive) Read, another processor has the segment in R state | S |
| | (Read Only) Read, another processor has the segment in R state | S |
| | (Exclusive) Read, another processor has the segment in S state | S |
| | (Read Only) Read, another processor has the segment in S state | S |
| | Write, no other processor has the segment | M |
| | Write, another processor has the segment in M state | M |
| | Write, another processor has the segment in E state | M |
| | Write, another processor has the segment in R state | M |
| | Write, another processor has the segment in S state | M |
| Exclusive (E) | No Request | E |
| | Read, no other processor has the segment | E |
| | Write, no other processor has the segment | M |
| | Invalidate request from system controller | I |
| | Shared request from system controller | S |
| Read | No Request | R |

TABLE 1-continued

| Current State | Event | Next State |
|---|---|---|
| Only (R) | Read, no other processor has the segment | R |
| | Write, no other processor has the segment | M |
| | Invalidate request from system controller | I |
| | Shared request from system controller | S |
| Shared (S) | No Request | S |
| | Read, another processor has the segment in S state | S |
| | Write, another processor has the segment in S state | M |
| | Invalidate request from system controller | I |
| | Exclusive request from system controller | E |
| Modi-fied (M) | No Request | M |
| | Read, no other processor has the segment | M |
| | Write, no other processor has the segment | M |
| | Invalidate request from system controller | I |

Note that two different types of read requests are defined in transitioning from the I state, an exclusive read and a read only read. In accordance with one embodiment of the present invention, the read type is defined at the page level and is stored in the TLB of the processor to indicate whether a segment is to be transferred to the cache of the processor in the E state or R state. For one embodiment of the present invention, these page attributes are provided to the system controller as well, allowing the system controller to determine whether the associated segment is capable of making a state transition without informing the system controller (as is the case for the E state).

Figure 3:
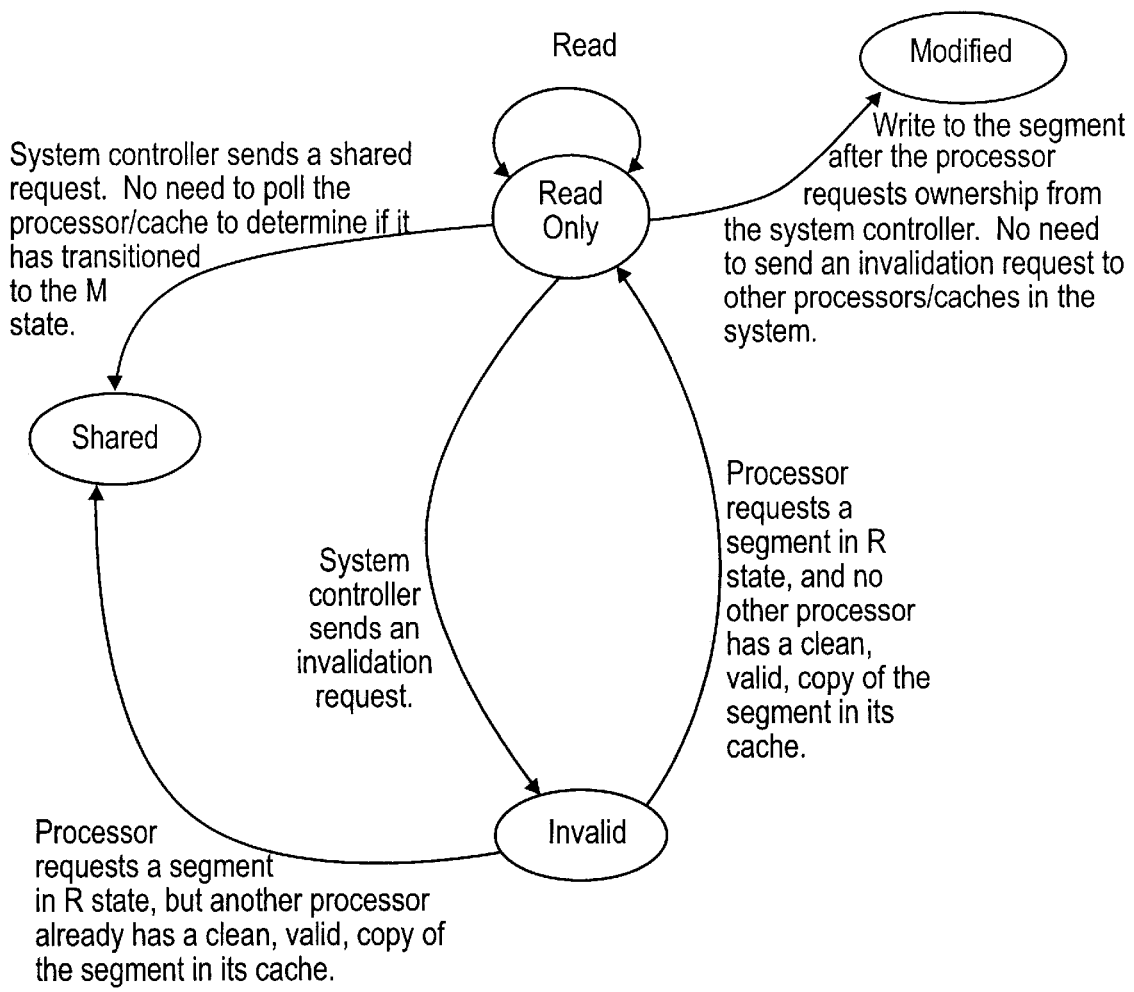
FIG. 3 highlights some transitions of the state diagram of FIG. 2.

FIG. 3 is a state diagram implemented in accordance with an embodiment of the present invention. The state diagram of FIG. 3 highlights the state transitions surrounding the R state of FIG. 2 and Table 1. Starting at the I state, it can be seen that when a processor requests (i.e. reads) a segment in the R state, and no other processor has a clean (i.e. unmodified), valid copy of the segment in its cache, the segment is transferred into the cache of the processor in the R state. Note, however, that if another processor does have a clean, valid copy of the segment in its cache, the segment is instead transferred into the cache of the processor in the S state.

Once the data segment is stored in the cache of the processor in the R state of FIG. 3, subsequent reads of the segment by the processor maintain the R status. If, however, the system controller subsequently sends an invalidation request (e.g. in response to another processor requesting ownership of the segment), the state of the data segment in the cache transitions back to I.

If the processor needs to write to the segment stored in its cache in the R state of FIG. 3, the processor first requests ownership from the system controller to gain write privileges. Upon receiving ownership, the state of the segment transitions to M. Note that in servicing the processor's request for ownership, the system controller does not need to send an invalidation request associated with the segment to other processors in the system. This is because, according to the R state algorithm described above, no other caches in the computer system have a copy of the segment to be invalidated. In contrast, note that when a segment in an S state needs to transition to the M state, the system controller must send an invalidation request associated with the segment. By eliminating the need to send this invalidation request (and any corresponding return acknowledgments from the processors), bus traffic is significantly reduced, and the transition from R to M occurs more quickly.

If the segment is in the R state of FIG. 3 and the processor receives a shared request from the system controller (e.g. in response to the system controller servicing a read request of the data segment from another processor of the computer system), the segment state transitions to S. Note that there is no need to poll the processor to determine if the segment state had transitioned to M before transitioning to S. This is because, according to the R state algorithm described above, the system controller is notified by the processor before the segment is permitted to transition from the R state to the M state. This notification may come in the form of a request for ownership of the data segment from the system controller by the processor, as described above. In contrast, note that when a segment in an E state needs to transition to the M state, the transition is silent. That is, the system controller is not informed, and must therefore poll the processor to determine if this transition took place before allowing the associated segment state to transition to S. By eliminating the need to poll the processor in this manner, bus traffic is reduced, and the transition from R to S occurs more quickly.

Figure 4:
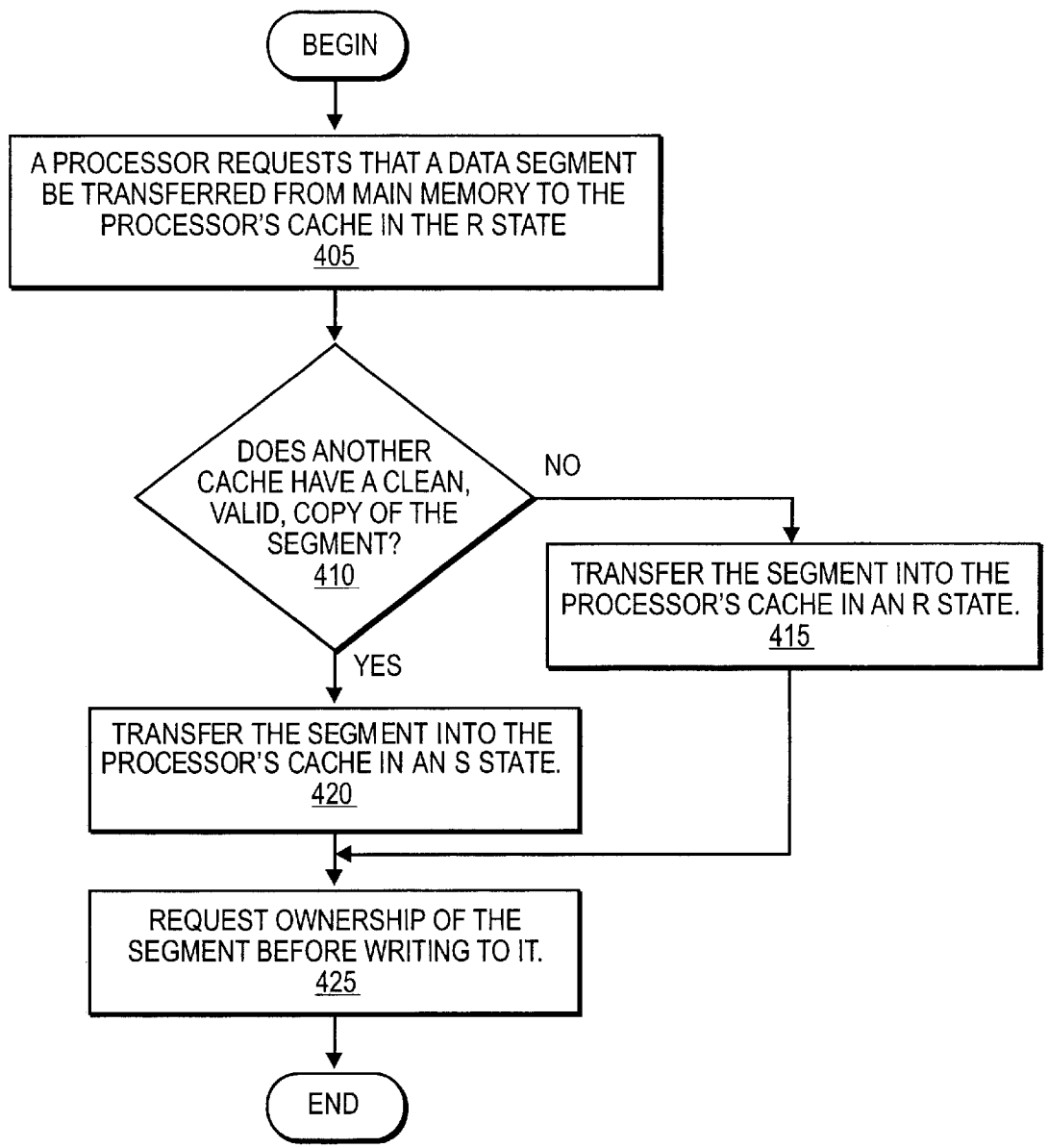
FIG. 4 is a flow chart showing a method of the present invention.

FIG. 4 is a flow chart showing a method of the present invention. At step 405, a processor requests that a data segment be transferred from main memory to the processor's cache in the R state. This request may come in the form of a main memory read by the processor. At step 410 it is determined whether or not a clean, valid, copy of the segment is currently stored in another cache of the computer system.

If no other cache has such a copy, then the segment is transferred (i.e. read) into the processor's cache in the R state at step 415 of FIG. 4. If, on the other hand, another cache has a clean, valid, copy of the segment, then the segment is transferred into the processor's cache in the S state at step 420. Next, both branches 415 and 420 proceed to step 425 where the processor requests ownership of the segment from the system controller before the processor writes to the segment. Note that if the segment is in the S state, then the system controller, in servicing the request for ownership of step 425, must send invalidation requests associated with the segment to the other processors of the computer system, and possibly wait for return acknowledgments. On the other hand, if the segment is in the R state, no such processor polling need be done, and the system controller can immediately grant the request for ownership to the processor.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A computer system comprising:
   a processor; and
   a processor cache to store a first segment in a first state of a cache coherence protocol, the first state being a Read-Only state in which no other processor of the computer system may have a clean, valid copy of the first segment, and in which the processor is to request ownership of the first segment before the processor may write to the segment.

2. The system of claim 1, wherein the cache is to store a second segment in a Shared state.

3. The system of claim 2, wherein the cache is to store a third segment in an Exclusive state.

4. The system of claim 3, wherein the cache is to store a fourth segment in a Modified state and a fifth segment in an Invalid state.

5. The system of claim 1, further comprising:
a system controller; and
a cache coherency directory accessible by the system controller to store an address of the first segment and a state of the first segment.

6. The system of claim 1, wherein ownership of the first segment is to be granted to the processor without sending an associated invalidation request to another processor of the computer system.

7. The system of claim 6, wherein the first segment is to be transitioned from the first state to a Shared state without polling the processor.

8. The system of claim 3, further comprising:
a system controller; and
a cache coherency directory accessible by the system controller to store an address of the first segment and the first state of the first segment, an address of the second segment and the Shared state of the second segment, and an address of the third segment and the Exclusive state of the third segment.

9. The system of claim 8, wherein the system controller is to grant ownership of the second segment to the processor after sending a global invalidation request.

10. The system of claim 9, wherein the cache coherency directory is to further store ownership information associated with the first and third segments using a binary encoding scheme.

11. A method comprising:
enabling a first segment to be stored in a first state in a processor cache of a computer system, the first state being a Read-Only state in which no other processor of the computer system may have a clean, valid copy of the first segment; and
preventing the processor from writing to the first segment while in the first state unless the processor requests ownership of the first segment.

12. The method of claim 11, further comprising enabling a second segment to be stored in a Shared state in the cache.

13. The method of claim 12, further comprising enabling a third segment to be stored in an Exclusive state in the cache.

14. The method of claim 13, further comprising:
enabling a fourth segment to be stored in a Modified state in the cache; and
enabling a fifth segment to be stored in an Invalid state in the cache.

15. The method of claim 12, further comprising:
enabling the processor to request ownership of the second segment before writing to the second segment; and
enabling ownership of the second segment to be granted to the processor after sending a global invalidation request.

16. The method of claim 13, further comprising:
enabling the processor to request ownership of the second segment before writing to the second segment; and
enabling the processor to write to the third segment without requesting ownership of the third segment.

17. The method of claim 11, further comprising enabling the ownership of the first segment to be granted to the processor without sending an invalidation request.

18. The method of claim 12, further comprising:
enabling the processor to request that the second segment be transferred from main memory to the cache in the first state; and
enabling the processor to determine that another cache has a clean, valid, copy of the second segment before storing the second segment in the Shared state.

19. The method of claim 11, further comprising enabling the first segment to be transitioned to a Shared state without polling the processor or cache.

20. The method of claim 11, wherein preventing the processor from writing to the segment includes enabling an indication that the processor owns the first segment using a binary encoding scheme in a directory of a system controller.

* * * * *